United States Patent [19]

Ballard et al.

[11] Patent Number: 4,512,243
[45] Date of Patent: Apr. 23, 1985

[54] VENTILATOR HAVING INSERT FOR CONTROLLING MOISTURE AND METHOD OF MAKING SAME

[75] Inventors: James W. Ballard, Livonia; Larry R. Ballard, Redford Township, Wayne County, both of Mich.

[73] Assignee: Charles Bonnici, Livonia, Mich.

[21] Appl. No.: 402,020

[22] Filed: Jul. 23, 1982

Related U.S. Application Data

[60] Continuation-in-part of Ser. No. 193,711, Oct. 3, 1980, and a continuation-in-part of Ser. No. 172,414, Jul. 25, 1980, Pat. No. 4,370,876, which is a division of Ser. No. 968,192, Dec. 11, 1978, Pat. No. 4,214,513.

[51] Int. Cl.$^3$ .................................................. F24F 7/02
[52] U.S. Cl. .................................. 98/42.01; 98/42.23; 98/66.1; 55/267; 55/285
[58] Field of Search ............... 98/42 R, 42 A, 66 R, 98/122; 52/198, 199; 55/385 C, 385 F, 487, 267, 435

[56] References Cited

U.S. PATENT DOCUMENTS

| | | | |
|---|---|---|---|
| 1,502,944 | 7/1924 | Earhart | 98/122 X |
| 1,898,859 | 2/1933 | Thorp | 98/2.11 |
| 4,187,390 | 2/1980 | Gore | 55/486 X |
| 4,325,290 | 4/1982 | Wolfert | 98/42 A |
| 4,399,743 | 8/1983 | Izzi, Sr. | 98/122 |

FOREIGN PATENT DOCUMENTS

| | | | |
|---|---|---|---|
| 881850 | 9/1971 | Canada | 98/122 |
| 676241 | 7/1952 | United Kingdom | 98/37 |

Primary Examiner—Harold Joyce
Attorney, Agent, or Firm—Cullen, Sloman, Cantor, Grauer, Scott & Rutherford

[57] ABSTRACT

A ventilator device for allowing escape of air from enclosed spaces such as a building includes a unitary housing provided with an insert for controlling the flow of mositure therethrough. The insulator includes a pair of insulative, tubular members between which there is sandwiched a fabric-like foraminous membrane which permits passage of moisture laden air outwardly through the ventilator but prevents moisture in the form of liquid or droplets from returning into the building through the ventilator.

28 Claims, 6 Drawing Figures

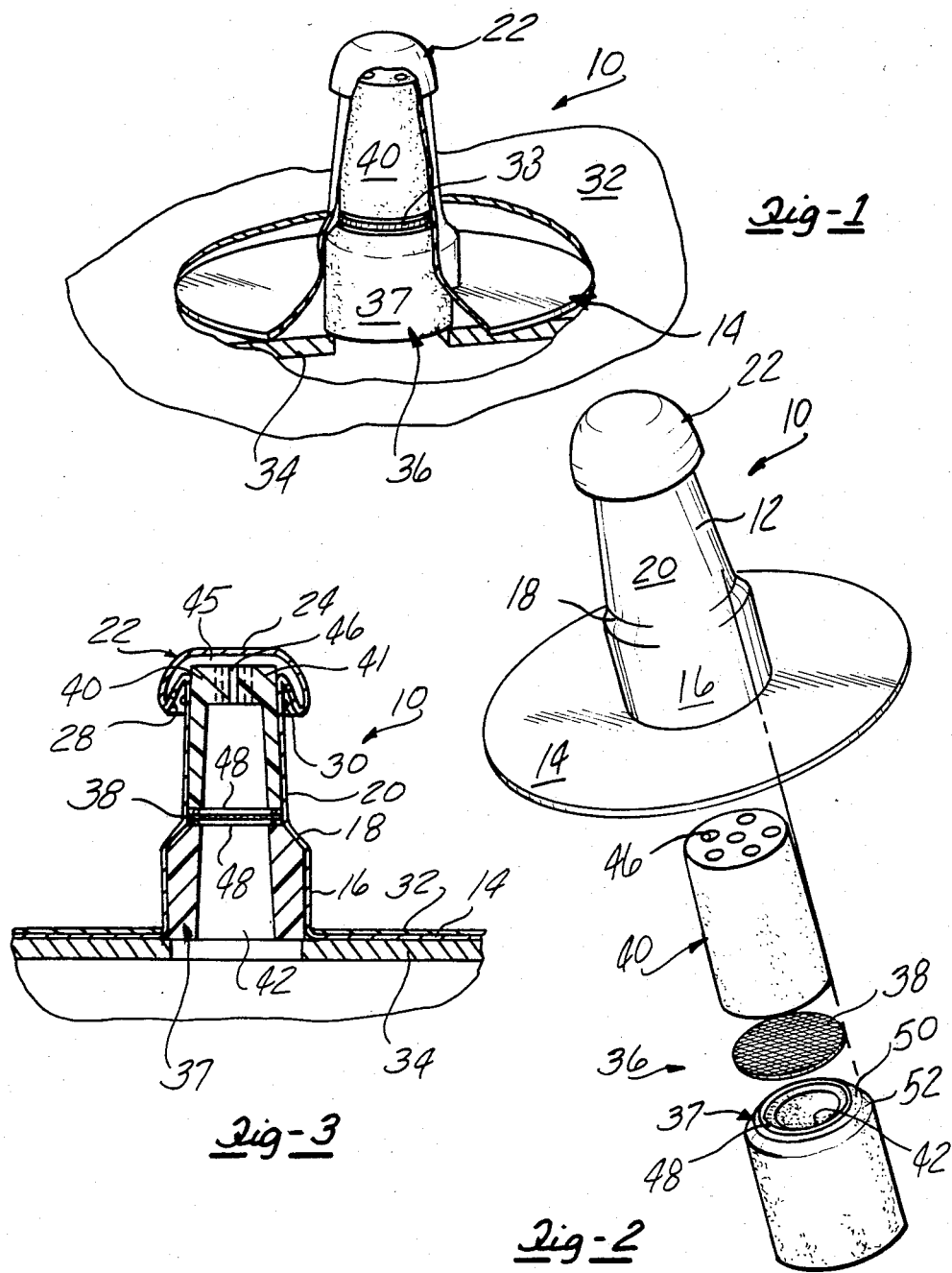

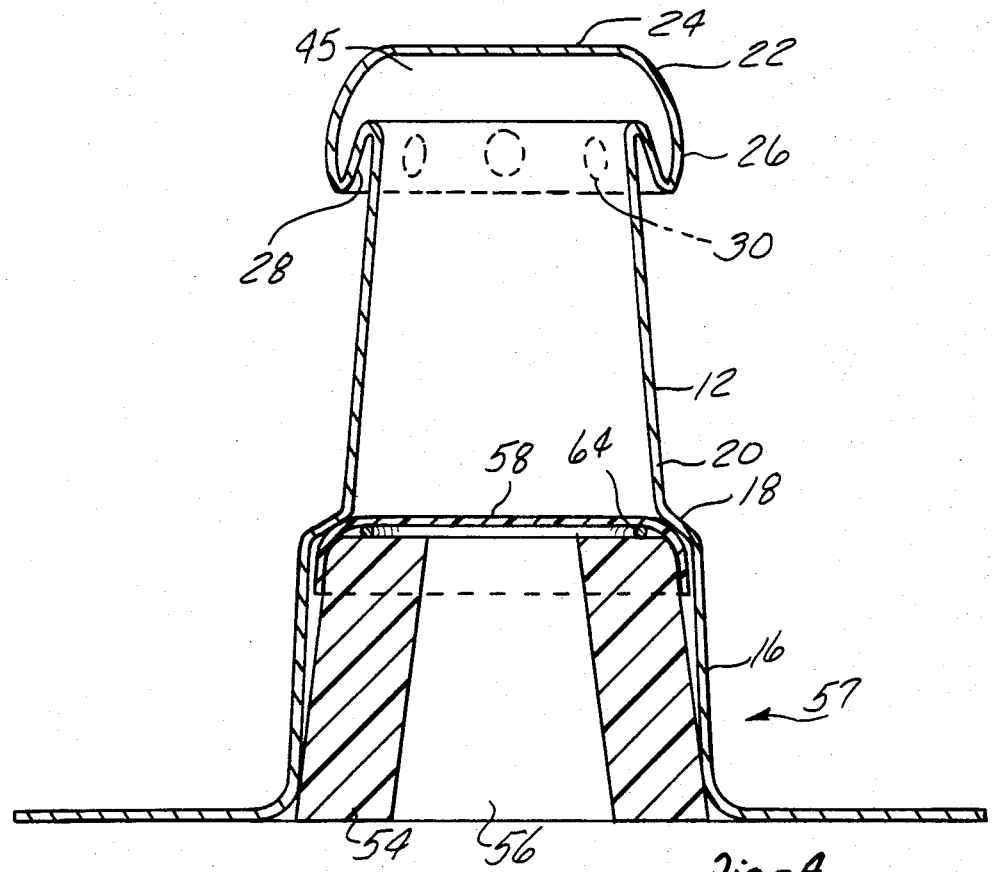
Fig-4
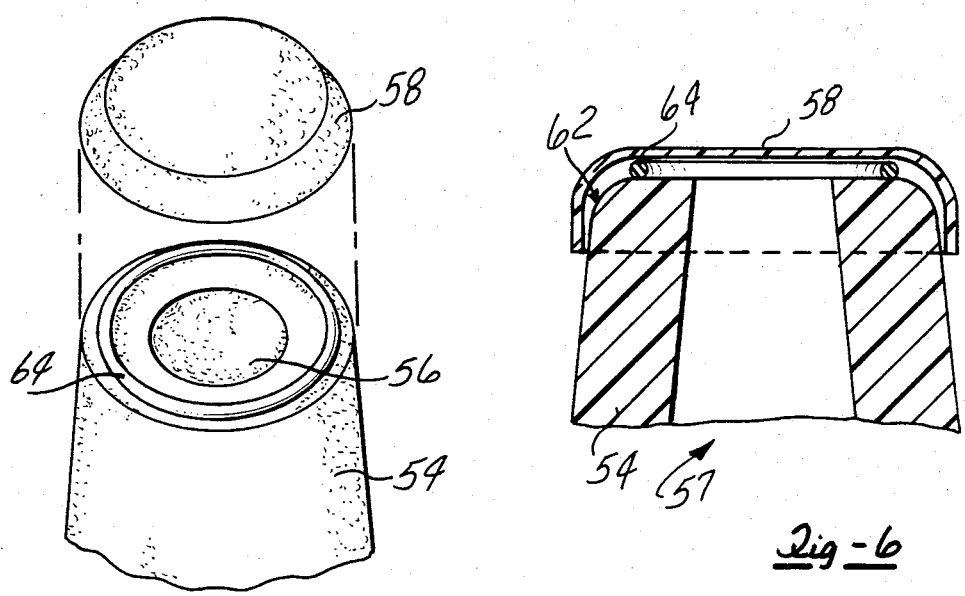
Fig-5
Fig-6

VENTILATOR HAVING INSERT FOR CONTROLLING MOISTURE AND METHOD OF MAKING SAME

DESCRIPTION

Related Applications

This application is a continuation-in-part of U.S. Ser. No. 172,414, filed July 25, 1980 now U.S. Pat. No. 4,370,876 which is a divisional of U.S. Ser. No. 968,192 filed Dec. 11, 1978, now U.S. Pat. No. 4,214,513, issued July 27, 1980, and is also a continuation-in-part of U.S. Ser. No. 193,711, filed Oct. 3, 1980 which is a reissue of U.S. Pat. No. 4,214,513, the entire disclosure of which are incorporated herein by reference.

TECHNICAL FIELD

The present invention generally relates to a roof ventilator device and a method of fabricating the same, and deals more particularly with a ventilator adapted to vent moisture vapor from enclosures while preventing reverse flow of condensation into the enclosure.

BACKGROUND ART

Ventilation devices adapted to be installed in a roof of a building are well known in the art. These devices are particularly important in cool weather when the interior temperature of the building is warm and the ambient outside temperature is cool. Under these conditions, moisture in the ambient atmosphere tends to condense on top of the roof. Moisture build-up on the roof not only results in degradation of the roof structure but also tends to have a deleterious effect on materials or apparatus stored beneath the roof. Ventilation devices are therefore commonly employed to provide an outlet for moisture through the roof.

Ventilation devices are also employed to prevent accumulation of moisture in insulation beneath the roof since moisture laden insulation drastically reduces insulation efficiency.

Still another purpose of ventilator devices is to allow escape of stale air.

Ventilation devices of the type described above are commonly constructed of metal materials, especially aluminum which are well suited to withstand exposure to the elements without rusting, discoloration, etc. The portions of metal ventilators that project outwardly beyond the roof are apt to be considerably cooler than the air in the interior space of the enclosure. As a result, when the moisture laden air contacts the inside surfaces of the vent, it immediately starts to cool thereby resulting in moisture which is condensed and collects from the interior surfaces of the ventilator. This phenomena reduces venting efficiency and in many cases the amount of moisture that may collect is sufficient to run downwardly back into the building.

U.S. Pat. No. 4,214,513 issued to James Ballard on July 29, 1980 discloses a ventilator device well adapted for use with the present invention. The ventilator shown in the Ballard patent includes a flat, annular base adapted to be attached to the roof and an upwardly extending tubular portion having a cap which prevents the introduction of rain or the like directly through the vent into the building. With a vent of this type, particularly during the colder seasons of the year in northern climates, there is a considerable difference in the temperature surrounding the exterior portion of the vent compared to the temperature of the air in the building. As a result, the moisture within the building, in the form of water vapor, is quickly cooled when it strikes the sidewalls of the cylindrical portion of the ventilator whose exterior surface is surrounded by the ambient cold air. The condition results in a considerable amount of moisture on the interior walls of the ventilator, which moisture is drawn by gravity back into the enclosure.

Another problem associated with prior art ventilator devices in addition to the fact that they are inclined to produce condensation involves the fact that they allow moisture in the ambient environment to enter the building. This phenomena is particularly prevalent during the evening hours when the roof structure cools. While water vapor which is present within an attic, for example, may well move outwardly during the daylight hours through the ventilator, it is often found that under cooler conditions, moisture is drawn back into the building through the same ventilator.

U.S. Pat. No. 3,984,947 issued to Patry October, 1976 discloses an example of a construction for preventing the backflow of moisture into a vented air. According to the patent, there is provided a flexible diaphragm which will deform under the influence of the air pressure experienced on its opposite sides. If the pressure within the building is higher than that outside, the diaphragm will flex and expose venting holes or openings through which the air can escape. On the other hand, if the pressure on the opposite side of the diaphragm is greater than that within the building, the diaphragm will close and there will be no passage for moisture to move inwardly pass the diaphragm into the building.

DISCLOSURE OF THE INVENTION

The present invention provides a means for insulating the interior of an air ventilator in a manner so as to reduce the possibility of condensation occurring on the interior of the ventilator, and also provides a means for permitting the movement of moisture laden air, in the form of water vapor, outwardly through the ventilator while at the same time preventing the movement of water in droplet form inwardly through the ventilator.

According to the present invention, there is provided a metal ventilator housing having an annular base and a tubular air vent extending upwardly therefrom. The housing is of unitary construction and includes a cap covering the top of the tubular member and a series of ventilation holes beneath the cap through which air from an enclosure may escape into the surrounding environment. The housing is provided with an insert including a pair of tubular members of insulative materials between which there is sandwiched a foraminous diaphragm or membrane of fabric-like material which allows the passage of moisture laden air in one direction therethrough but prevents the passage of moisture droplets in the opposite direction. In one embodiment, the tubular members are substantially co-extensive with the housing so as to insulate essentially the entire length of the housing in order to prevent accumulation of condensation on the interior walls of such housing. The membrane is porous to moisture in the form of vapor but is impervious to water in the form of a liquid. The term "water vapor" as used herein is defined as individual molecules of water, while water in liquid form is defined as a multiplicity of individual water molecules having been bonded together to form a liquid.

According to another aspect of the invention a novel method of manufacturing the ventilator described above is provided which includes the steps of forming a housing including a tubular portion, forming a pair of tubular members of insulative material, sandwiching a foraminous membrane between the tubular members and installing the insert within the housing.

BRIEF DESCRIPTION OF THE DRAWINGS

In the drawings, wherein like components are designated by identical reference numerals of the various views:

FIG. 1 is a fragmentary, perspective view of the preferred form of the ventilator device of the present invention shown installed in a typical roof, parts being broken away in sections for clarity;

FIG. 2 is a perspective, exploded view of the device shown in FIG. 1;

FIG. 3 is a cross-sectional view of the device shown in FIG. 1;

FIG. 4 is a cross-sectional view of an alternate form of the ventilator device of the present invention;

FIG. 5 is a perspective, exploded view of the insert forming a part of the ventilator device shown in FIG. 4; and, FIG. 6 is a fragmentary, cross-sectional view of the insert shown in FIG. 5 during fabrication thereof.

BEST MODE FOR CARRYING OUT THE INVENTION

Referring first to FIGS. 1-3, the present invention broadly involves a ventilator device, generally indicated by the numeral 10, adapted to be installed in a roof 34 or the like of a building.

The device 10 includes a housing 12 of unitary construction, preferably metal such as aluminum. Housing 12 includes a substantially flat, annular base 14 formed integral with a tubular portion comprising a lower cylindrical portion 16 joined by a shoulder-like annular transition 18 to a truncated, fustro-conical upper portion 20. The housing 12 further includes a cap 22 comprising a topwall 24, a downwardly extending, arcuately shaped sidewall 26 and an inclined interior wall 28 provided with a plurality of ventilating apertures 30 therein. From the foregoing it may be appreciated that the housing 12 is essentially hollow thus allowing air within the building to pass therethrough and outwardly into the ambient environment through ventilating apertures 30. Housing 12 is adapted to be installed over an opening in roof 34 with roofing material 32 being applied over the annular base 14.

The device 10 further includes an insert generally indicated by the numeral 36 for controlling moisture passing through housing 12. Insert 36 comprises a body of insulative material, such as polystyrene, and includes a lower portion 37 and upper portion 40 between which there is sandwiched a circularly shaped, essentially flat diaphragm-like membrane 38, the details of which will be discussed hereinbelow. The lower portion 37 is essentially cylindrical and is provided with a beveled upper edge 52 adapted to conformingly engage transition 18 in housing 12. The outside diameter of lower portion 37 is essentially identical to the inside diameter of lower portion 16 of housing 12. Membrane 38 is adhesively attached to an annular upper surface 50 of lower portion 37 by means of any suitable adhesive such as a layer of wax 48. Similarly, a layer of wax 48 is applied to the bottom surface of upper portion 40 so as to bond upper and lower portions 37 and 40 as well as membrane 38 into a single assembly. Lower and upper portions 37 and 40 of insert 36 are provided with corresponding, centrally located passageways 42 and 44 respectively, so as to allow air within the building to pass through membrane 38. The upper end of upper portion 40 includes an essentially solid cap 41 provided with a plurality of longitudinally extending spaced passageways 46 which place passageway 44 in communication with a chamber 45 immediately beneath the top 24 of cap 22. The top of upper portion 40 extends upwardly coextensive with or slightly above the top of upper portion 20 of housing 12, into the chamber 45. Upper portion 40 of insert 36 is also fustro-conical shape essentially identical to the interior wall of upper portion 40 of housing 12 so as to conformingly engage the interior sidewalls of upper portion 20.

The diaphragm like membrane 38 comprises a material which is pervious to water in the form of a vapor, i.e. individual molecules of water, but will not permit the passage of water as a liquid, i.e., water wherein hundreds of thousands of individual molecules bond together to form drops or larger units of water. One material suitable for use as the membrane 38 is available from WL Gore and Associates, Inc. of Elkton, Md. and is sold under the trademark "GORE-TEX". The gore-tex material has a fabric-like quality and is constructed of a tetrafluoroethylene polymer in a porous form which has an amorphous content exceeding about 5% and which has a microstructure characterized by nodes interconnected by fibrils and has a matrix tensile strength in at least one direction above 7300 psi. A material of the type described above is fully disclosed in U.S. Pat. Nos. 3,953,566 and 4,187,390 issued to Robert W. Gore, the entire disclosures of which patents are incorporated by reference herein.

Membrane 38 extends entirely across passageway 46 and the layer of wax 48 provides a water tight seal between membrane 38 and lower body portion 37.

A layer of hot wax or other suitable adhesive may be interposed between the sides of the insert 36 and interior sidewalls of housing 12 so as to retain the insert 36 therein.

In order to fabricate the insert 36, the upper and lower portions 40 and 37 respectively, may be formed as by molding, with the passageways 42, 44 or 46 being either molded or machined as desired. If desired, passageways 42 and 44 may be of equal diameter in which case upper and lower portions 40 and 37 may be molded simultaneously as a single member following which a transverse cut is made at surface 50 to separate the two portions. An adhesive seal material is then applied between surface 50 and membrane 38 following which a similar sealing and bonding material is applied between membrane 38 and the lower end of upper portion 40. The assembled insert 36 is then inserted through the open end of housing 12 and may be retained in press fit relationship therein; alternatively, a quantity of adhesive material may be introduced between the insert 36 and interior sidewalls of the housing 12.

Attention is now directed to FIGS. 4-6 wherein an alternate form of the ventilator device is depicted. In this embodiment of the invention, the housing 12 is essentially identical to that previously described, with the insert generally indicated by the numeral 57 being of somewhat different construction. Insert 57 is preferably formed as by molding from an insulative material such as styrofoam and is provided with slightly tapering exterior sidewalls defining a mildly frustro-conical configuration, the lower portion of the exterior sidewall of insert 57 engaging the bottom of cylindrical portion 16 of housing 12 while upper portions of the exterior sidewalls of insert 57 are somewhat radially spaced inwardly from upper portions of the cylindrical portions 16 of housing 12.

Insert 57 is provided with a longitudinally extending frustro-conically shaped passageway 56 therein.

A circularly shaped, flat membrane 58 formed from material essentially identical to that previously described with reference to membrane 38 is adapted to overlie the upper end of passageway 56 and has the periphery thereof extending downwardly over the sides of body 54. A bead 64 of adhesive, sealing material such as wax is applied to the upper end of body 54 so as to seal and retain membrane 58 on body 54. A tight seal is created between the upper interior space of housing 12 and insert 57 by virtue of an annular, arcuately shaped shoulder 62 on body 54 which biases the periphery of membrane 58 into sealing, retaining relationship to the annular transition 18.

The ventilation device shown in FIGS. 4–6 is manufactured by first forming the housing 12 as disclosed in U.S. Ser. No. 172,414 filed July 23, 1980. The insert 57 is then formed by molding or machining body 54 and forming the passageway 56 therein. A bead 64 of wax or the like is then applied along the top surface of body 54 following which membrane 58 is juxtaposed over the top of body 54. Body 54, with the membrane 58 having been secured thereto is then inserted into the open end of housing 12 until the shoulder 62 engages annular transition 18. The insert 56 may be held in press-fit relationship within the housing 12, or, alternatively, adhesive may be introduced between insert 57 and the lower portion 16 of housing 12.

In use, the insert 36 and 57 prevent the accumulation of moisture within the housing 12 while allowing moisture laden air to pass through membranes 38 and 58 and out of the housing 12 via apertures 30. Additionally, membranes 38 and 58 prevent moisture in the form of droplets or larger units from passing downwardly back into the building. In the case of the embodiment of the invention shown in FIGS. 1-3, it may be appreciated that the insulative material of the insert 36 insulates essentially the entire surface area of the upper and lower portions 20 and 16 respectively of housing 12, thereby preventing moisture from accumulating on the interior walls of the housing 12. Additionally, by virtue of the fact that the top of the end cap 41 extends up to or beyond the upper end of upper portion 12, and into chamber 45, moisture laden air escaping from the building is prevented from coming into contact with the upwardly projecting sides of housing 12, and such air does not contact the housing until it enters chamber 45. Upon entering chamber 45, any condensation which may accumulate on the interior of the housing flows down the sidewalls 26 of the cap 22 and out of the device 10 through apertures 30. Moreover, water droplets accumulating on the bottom surface of cap 24 are prevented from readily re-entering the insert 36 by virtue of the fact that the top of end cap 41 is not essentially completely open, but rather is only provided with a limited number of passageways 46; consequently water droplets falling from cap 24 into the upper face of end cap 41 tends to roll off the insert 36 and are drained out through apertures 30.

From the foregoing, it is apparent that the ventilator device and method of constructing the same described above not only provide for the reliable accomplishment of the objects of the invention but do so in a particularly effective and economical manner. It is recognized, of course, that those skilled in the art may make various modifications or additions to the preferred embodiment chosen to illustrate the invention without departing from the spirit and scope of the present contribution of the art. Accordingly, it is to be understood that the protection sought and to be afforded hereby should be deemed to extend to the subject matter claimed and all equivalents thereof fairly within the scope of the invention.

We claim:

1. A ventilator device, comprising:
    an elongate, essentially hollow tube having openings at opposite ends thereof through which air may pass; and,
    means mounted within said tube for inhibiting the flow of moisture in said air in one direction through said tube, said inhibiting means including a body of insulative material having an air passageway longitudinally therethrough and a foraminous membrane extending transversely across said passageway, said membrane allowing moisture laden air to pass therethrough but preventing water droplets from passing therethrough, said body including a first and second portion, said membrane being disposed between said first and second portion.

2. The ventilator device of claim 1, wherein said membrane is substantially planar and is bonded to said first and second portion by a layer of wax.

3. The ventilator device of claim 1, wherein said body is bonded to the interior of said tube by a layer of wax.

4. The ventilator device of claim 1, wherein said body is essentially circular in cross-section and said first portion possesses a diameter greater in magnitude than said second portion.

5. The ventilator device of claim 1, wherein said passageway is defined by a first bore extending through one section of said second portion and disposed coaxial with the longitudinal axis of said body, and a plurality of apertures in another section of said second portion, said apertures being radially spaced from said longitudinal axis.

6. The ventilation device of claim 1, wherein said tube is of one piece, unitary construction and includes an essentially cylindrical base, a tapered portion, an annular transition portion between said base and said tapered portion and a cap on one end of said tapered portion having apertures therein.

7. An improved device for ventilating a building through the roof thereof and of the type including an elongate, essentially hollow body having one end thereof essentially open and mounted on said roof, the other end thereof having a closure cap thereon and provided with apertures therein through which moisture laden air may exit from said building, the improvement comprising:
    an insert in said body for preventing moisture in units of water droplets or larger from entering said building through said body, said insert including a body portion having a longitudinal passageway for substantially preventing passage of water droplets in one direction therethrough, said body portion including first and second sections, said preventing means being sandwiched between said first and second sections.

8. The improvement of claim 7, wherein said body portion comprises polystyrene foam.

9. The improvement of claim 7, wherein said first and second sections are bonded to said preventing means by a layer of wax.

10. The improvement of claim 7, wherein said preventing means comprises a layer of porous material consisting essentially of polytetrafluoroethylene polymer having a microstructure characterized by rods interconnected by fibrils and has a matrix tensile strength in at least one direction above 7300 psi.

11. A vent comprising:
a hollow, generally cylindrical member having a base adapted to be supported on a roof, said base having an opening beneath and leading into said cylindrical member;
an upper opening adjacent the other end of said cylindrical member and a membrane between said two openings;
said membrane being porous to water in the form of vapor, but being impervious to water in liquid form; and
an insulating member lining said chamber beneath said membrane, said membrane being supported on said insulating member, said insulating member having a central opening for the passage of air therethrough with said membrane closing said central opening in said insulating member,
said insulating member comprising upper and lower portions joined together in an assembly within said cylindrical member,
said membrane being received and supported between said two portions,
both said portions having a central air passageway.

12. The vent of claim 11, wherein:
said upper portion has an upper closure member extending across its central passageway;
a series of passageways extending through the latter closure member for passage of air containing fluid outwardly of said insulating member.

13. The vent of claim 12, wherein:
said vent comprises an upper cylindrical section receiving said insulating member and the insulating member extends above said cylindrical section of said vent.

14. The vent of claim 11, wherein:
said membrane is secured to said insulating member by adhesive means.

15. The vent of claim 14, wherein:
said adhesive means is wax.

16. The vent of claim 11, wherein:
said insulating member is formed with an exterior wall complementary in shape to the interior wall of said cylindrical member and sized so as to be held in said cylindrical member by friction when inserted into the latter member.

17. A method of fabricating a ventilation device, comprising the steps of:
(A) forming a tubular housing through which air may flow;
(B) forming a first insulative member;
(C) forming an air passageway in said first member;
(D) applying a liquid impervious, porous membrane through which moisture laden air may flow to said first member and over said passageway;
(E) inserting said first member having said membrane applied thereto into said tubular housing;
(F) forming a second insulative member;
(G) forming air passageway in said second member; and
(H) connecting said second member with said first member with said membrane sandwiched therebetween.

18. The method of claim 17, wherein step (E) is performed by sliding said first and second members into said housing until one end of said second member extends at or above the top of said tubular housing.

19. A ventilation device, comprising:
an elongate hollow tube having, an air inlet opening in the bottom thereof, and air outlet opening in the top thereof, and a longitudinal passageway connecting said inlet and outlet openings through which air may flow;
a generally planar, foraminous member extending substantially across said passageway and between said air inlet and outlet openings for preventing moisture in liquid form from passing in one direction through said tube but allowing moisture laden air to pass in the other direction through said tube; and,
means within said tube for mounting said foraminous member within said tube, said mounting means including a sleeve of structurally self-supporting foamed synthetic material, said sleeve having a longitudinal opening therein, said planar foraminous member being secured to said sleeve and extending across said longitudinal passageway whereby all of the air flowing through said tube passes through said planar foraminous member.

20. The ventilator of device of claim 19 wherein the diameter of said longitudinal passageway is substantially less than the diameter of said tube and said sleeve substantially forms a layer of thermal insulation between the interior wall of said tube and said passageway along at least a portion of the length of said tube.

21. The vent of claim 19, wherein said sleeve includes first and second elongate portions, said foraminous member being disposed between said first and second portions.

22. The vent of claim 19, wherein said sleeve includes an exterior sidewall generally conforming to the interior sidewall of said tube and said tube includes an annular shoulder engaging said sleeve and acting as a stop to limit the movement of said sleeve within said tube.

23. A roof ventilator, comprising:
an elongate, essentially hollow tube having a longitudinal passageway therein through which air may flow;
a structurally self supporting, thermally insulative sleeve of foamed synthetic material lining at least a portion of the interior wall of said tube within said passageway, said sleeve including an inside wall exposed to and defining and air space within said passageway which is thermally insulated from said interior wall; and
a generally planar, foraminous member for controlling the flow of moisture in one direction through said passageway, said foraminous member being secured to said sleeve and extending across said air space, whereby all of the air flowing through said passageway passes through said foraminous member.

24. The roof ventilator of claim 23, wherein said sleeve is disposed in one end of said tube and said foraminous member is mounted on one end of said sleeve and intermediate the ends of said tube.

25. The roof ventilator of claim 23, wherein said tube includes a shoulder in said passageway and said foraminous member is trapped between said sleeve and said shoulder.

26. The roof ventilator of claim 23, wherein said tube includes a first portion having a first diameter and a second portion having a second diameter, said first diameter being greater in magnitude than said second diameter, said tube including a shoulder between said first and second portions, said sleeve being received and confined within said first portion of said tube, said shoulder engaging said sleeve and limiting movement of said sleeve within said tube.

27. The roof ventilator of claim 23, where the longitudinal axis of said tube extends substantially vertically and said foraminous member is spaced from the bottom end of said tube.

28. The roof ventilator of claim 27, including a cap secured to said tube and covering the top of said tube, said passageway defining an opening in said top of said tube beneath said cap.

* * * * *